Jan. 30, 1968  W. H. COWLES ET AL  3,366,155
FUEL CONTROL

Filed June 30, 1965  2 Sheets-Sheet 1

INVENTORS
WARREN H. COWLES
WALTER R. KAMINSKI
BY
Walter Pertnacks, Jr.
John P. Moran
ATTORNEYS

INVENTORS
WARREN H. COWLES
BY WALTER R. KAMINSKI

ATTORNEYS

United States Patent Office 3,366,155
Patented Jan. 30, 1968

3,366,155
FUEL CONTROL
Warren H. Cowles, Birmingham, Mich., and Walter R. Kaminski, North Palm Beach, Fla., assignors to Holley Carburetor Company, Warren, Mich., a corporation of Michigan
Filed June 30, 1965, Ser. No. 468,433
23 Claims. (Cl. 158—11)

This invention relates generally to turbine engine fuel controls, and more particularly to a novel fuel control for supplying gaseous type fuels to stationary industrial turbine engines.

Since the use of gaseous fuel is generally more economical than using liquid fuel, it has become the practice to adapt stationary power plants for operation on both gaseous and liquid fuel, the intention being that the engine will be operated on gaseous fuel as long as a sufficient supply thereof is available. Thus, when the use of natural gas for industrial purposes must be reduced, as it often is during late afternoon when household use thereof reaches its peak, the engine can be temporarily switched over to liquid fuel until such time as the natural gas supply for industrial uses again becomes adequate. The switch to liquid fuel would, of course, be made at any time that the natural gas supply is inadequate, and the switch from gas to liquid, and vice versa, must be smooth and instantaneous.

Under these circumstances, there is a need for a fuel control adapted to properly supply gaseous fuel such as natural gas, rather than liquid fuel, to a gas turbine engine in quantities sufficient to meet the energy requirements of the engine over the entire range of operation thereof. To assure continuous operation of the power plant, it is necessary that the gaseous fuel control may be operated in conjunction with any suitable liquid fuel control.

Accordingly, a general object of the invention is to provide a fuel control adapted to meter sufficient gaseous fuel to the engine to satisfy the total energy requirements of the engine under all operating conditions.

Another object of the invention is to provide such a control which receives its scheduling signal from any suitable liquid fuel control which, through appropriate valving and conduitry, supplies liquid fuel through a portion of the gaseous fuel control, rather than directly to the engine, as would normally be the case, and then through a heat exchanger and back to the liquid fuel reservoir.

Still another object of the invention is to provide a combination of a gaseous and a liquid fuel control, wherein either the liquid fuel control or the gaseous fuel control may supply the fuel required by the engine, as desired by the operator.

A further object of the invention is to provide such a gaseous fuel control which is reliable, accurate, rugged and relatively inexpensive and which will function properly over a temperature range of from a —65° F. up to a +350° F.

Another object of the invention is to provide such a control which provides for adjusting the various components thereof in order to compensate for different gas density and/or B.t.u. values characteristic of fuels from different sources throughout various parts of the country.

An additional object of the invention is to provide such a control which may provide for automatically adjusting the fuel flow to compensate for density changes resulting from any temperature changes in the natural gas.

Still another object of the invention is to provide such a control which includes a universal basic control unit, with the above mentioned density and/or B.t.u. and temperature adjustment features as optional equipment, to meet the specific requirements of individual engine applications.

A still further object of the invention is to provide such a control which may be operated with a relatively low pressure gas supply.

A further object of the invention is to provide such a control which modulates the scheduling hydraulic signal received from the liquid fuel control in accordance with gaseous fuel inlet pressure variations.

Other objects and advantages of the invention will become more apparent when reference is made to the following specification and the accompanying drawings, wherein.

Over-all engine installation

Figure 1:
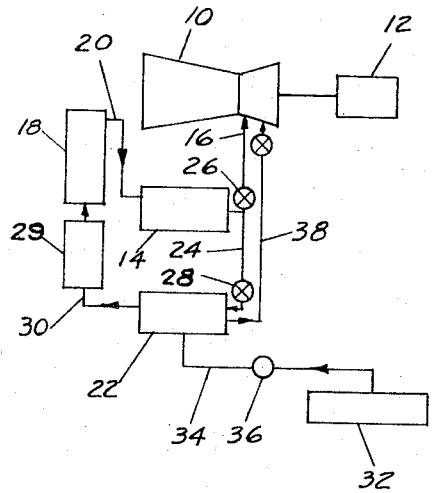
FIGURE 1 is a block diagram layout of a gas turbine engine having a fuel control system embodying the invention.

Referring now to the drawings in greater deail, FIGURE 1 illustrates a stationary industrial gas turbine engine 10 operating any suitable device, indicated as load 12. The engine 10 may be supplied liquid fuel by any suitable liquid fuel control 14, the details of construction of which need not be shown, via a conduit 16, the fuel control being supplied with liquid fuel from a fuel source 18 via a conduit 20. In accordance with the objects of the invention, a gaseous fuel control 22 is included in the system.

A conduit 24 communicates between any suitable liquid fuel control 14 and the gaseous fuel control 22, and liquid fuel may be diverted from the engine 10 to the gaseous fuel control 22 by closing off a valve 26 in the line 16 and opening a valve 28 in the line 24. As will be explained later, this liquid fuel provides a hydraulic signal to the portion of the gaseous fuel control 22 through which it flows, the fuel ultimately flowing through a heat exchanger 29 connected in a conduit 30 leading back to the liquid fuel source 18. The signal received by the gaseous fuel control 22 controls, in a manner to be described, the flow of natural gas through the gaseous fuel control 22.

The natural gas is supplied to the control 22 from a gaseous fuel source 32 via a conduit 34. A pressure regulator 36 may be included in the conduit 34. The gaseous fuel control 22, being influenced by the hydraulic signal, will supply natural gas to the engine 10 via a conduit 38, in quantities such that the total energy content thereof is the same as would be the case if liquid fuel were being supplied directly to the engine 10.

Gaseous fuel control

The gaseous fuel control 22 includes a housing 40 which may consist of several matching parts. In any event, the housing 40 includes an inlet 42 and an outlet 44 for the natural gas and an inlet 46 and an outlet 48 for liquid fuel. A main fuel passage 50, including a venturi 52, communicates between the inlet 42 and the outlet 44. A rod-like pointed member 54 may extend through a wall 56 of the housing 40 into the throat of the venturi 52, the member 54 being manually adjustable along the axis of the venturi 52 by means of an adjustment screw 58, for a purpose to be explained. A scale 60, indicative of a range of B.t.u. values, is attached to or formed on the housing 40 adjacent the screw 58, and a marker 62 extends from the member 54 so that it may be aligned with any of the B.t.u. marks 64 on the scale 60. As the screw 58 is turned, the rod 54 moves axially due to the pin 65 being located in the groove 67 formed in the rod 54, the marker 62, merely moves with the rod 54.

A diaphragm assembly 66 provides a movable wall between chambers 68 and 70 formed in the housing 40. A throttling valve 72 secured to the diaphragm assembly 66 includes a circular shoulder 74 which is slidably mounted in a cylindrical passage 76 communicating between the main fuel passage 50 and the chamber 68. A throttling valve head 78 is formed on a stem 80 extending from the shoulder 74 across the passage 50 and is slidably mounted within a cylindrical opening 82, the latter communicating between the inlet 42 and the main fuel passage 50 via openings 83 formed in the wall thereof.

A passage 84 communicates between the gaseous fuel inlet 42 and the chamber 68 adjacent one side of the diaphragm 66, and a filter 86 is mounted in another chamber 88 adjacent the passage 84. A passage 90 communicates between the gaseous fuel inlet 42 and the chamber 88, while another passage 92 communicates between the chamber 88 and the chamber 70 adjacent the other side of the diaphragm 66. A spring loaded bypass valve 94 may be mounted in still another passage 96 which communicates between the filter chamber 88 and the passage 92 leading to the chamber 70 in the event that the filter 86 becomes clogged. A spring 98 mounted in the chamber 68 between an abutment 100 and the diaphragm assembly 66 urges the diaphragm in a direction which decreases the size of the chamber 70.

Locating the throttling valve 78/83 upstream of the venturi 52 makes possible a larger gaseous flow signal across the force balance system 130. This is due to the increased velocity through the venturi 52 resulting from the pressure drop across the opening 78/83.

An additional plurality of chambers 102, 104, 106 and 108 are formed within the housing 40, with a diaphragm assembly 110 forming a movable wall between the chambers 102 and 104 and a diaphragm assembly 112 forming a movable wall between the chambers 106 and 108. A rod 114, surrounded by a cylindrical spacer 116, connects the diaphragm assemblies 110 and 112 by virtue of the rod being slidably mounted within a bushing 118 pressed into an opening 120 extending between the chambers 104 and 106. The ends of the rod 114 extend beyond the spacer 116, through the centers of the assemblies 110 and 112 where they are fastened by means of nuts 122 and 124, respectively. A round pin 126 is slidably mounted within a bashing 128 pressed into an opening 129 between the chamber 102 and the chamber 70. The elements 112, 114, 116, 110, 126 and 66 make up a force balance system 130, which controls the positioning of the throttling valve 78 in a manner to be described.

A balancing pin 132 is slidably mounted within a hollow member 134 threadedly inserted in a wall of the housing 40 adjacent the chamber 108, the pin 132 being held against the end 124 of the rod 114 in a manner which will be described later. Openings 136 in the walls of the member 134 communicate between the axial passage 138 thereof and an annulus 140 surrounding a portion thereof. A passage 142 communicates between the annulus 140 and the chamber 70. A spring retainer 144 is mounted within the chamber 108 on the end of the member 134. A spring 146 is mounted between the retainer 144 and the diaphragm assembly 112. The member 134 may be turned to reposition the retainer 144. An adjustable stop member 146 is threadedly mounted within the member 134 adjacent the end 148 of the balancing pin 132.

A chamber 150 is formed adjacent the main fuel passage 50, and a passage 152 communicates between the chamber 150 and the chamber 108. Another passage 154, including a fixed temperature modulating restriction 156, communicates between passage 152 and the throat of the venturi 52, while still another passage 158 communicates between the passage 154 and the chamber 102. The fixed restriction 156 is provided in the passage 154 between the junctions thereof with the passages 152 and 158. A valve seat 160 is formed in the chamber 150, and a temperature responsive valve assembly 162 is mounted across the main fuel passage 50, the valve 163 portion thereof being urged toward the valve seat 160 by a spring 164 which abuts at its one end against a wall of the housing and at its other end against a retainer 166 formed on the valve 162. A plurality of bimetallic disks 168 are mounted around the valve stem 162 and between the spring retainer 166 and an abutment 170 mounted at the inlet to the chamber 150. Openings 172 formed in the abutment 170 communicate between the main fuel passage 50 and the chamber 150 upstream of the valve seat 160. In the event the temperature of the gas remains constant, the assembly 162 would not be required and the fixed restriction 156 would be replaced by a plug, blocking off communication between the passages 152 and 158.

Under certain conditions, a valving assembly 174 is threadedly mounted in the liquid fuel inlet 46. A fixed restriction 176 is threadedly mounted in the axial passage 178 formed through the assembly 174. A check valve 180 having an opening 182 therethrough different in diameter from the opening through the fixed restriction 176 is included in the axial passage 178 adjacent the fixed restriction 176 and urged away from the fixed restriction 176 and toward a fixed hollow abutment 184 by a spring 186. A pair of chambers 188 and 190 are formed in the housing 40, and a perforated wall 192 is included between the chambers 188 and 190. A passage 194 communicates between the liquid fuel inlet 46 and the chamber 188, while a passage 196 communicates between the chamber 190 and the liquid fuel outlet 48. A valve seat 198 is formed in the chamber 188. A valve member 200 is slidably mounted in a central opening 202 in the wall 192, the valve member 200 including a contoured center portion 204 which serves as the valve and cooperates with the valvse seat 198. The valve member 200 is urged into the chamber 190 by a spring 206 mounted in the chamber 188 so as to urge the larger diameter portion of the contour 204 toward the valve seat 198. A passage 208 including a dampening restriction 210 communicates between chamber 188 and the chamber 106. A passage 212 including a second dampening restriction 214 communicates between the chamber 190 and the chamber 104, while still another passage 216, including a calibrated fixed restriction 218, communicates between the passages 212 and 208.

A member 219 is slidably motunted within a manually adjustable member 220. The latter being threadedly mounted in a wall of the housing 40 adjacent the chamber 190. A scale 221 is mounted on the housing 40 and a marker 222 extends thereto from the screw 220, for a purpose to be described. As the screw 220 is turned, the pointer 222 moves along the scale 221 by virtue of a pin 215 which is secured to the screw 220 and movable in the groove 217 formed in the member 219. A stem 223 extends from the adjustable member 220 into the chamber 190, and a lever 224 is pivotally mounted on the stem 223. The lever 224, which includes a tapered portion 225, is urged toward the end of the valve member 200 by a pin 226 which is slidably mounted within a flanged guide 228 held against a wall 230 by a spring 240, the wall 230 being located between the chamber 190 and an adjacent chamber 232. Openings 234, formed through the guide 228, communicate between the two chambers 190 and 232. A diaphragm assembly 236 forms a movable wall between the chamber 232 and an adjacent chamber 238, the assembly 236 being urged toward the pin 226 by a spring 239 in the chamber 238, against the force of the spring 240 in the chamber 232. Due to the forces of the springs 239 and 206, and the pressure within the chamber 238, it may be noted that the valve member 200, the lever 224, the pin 226, and the diaphragm assembly 236 will be maintained in continual series contact. The retainer 241 for the spring 239 may be manually adjusted by means of a screw 242. A passage 242 supplies natural gas from the main fuel passage 50, just upstream of the venturi 52, and the chamber 238.

Figure 3:
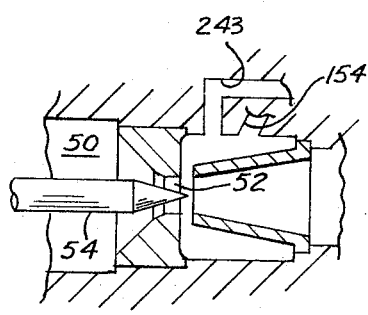
FIGURE 3 is a fragmentary view illustrating a modification of a portion of the structure shown by FIGURE 2.

As illustrated in FIGURE 3 and as one skilled in the art would normally consider to be the better practice, the passage 243 leading to the chamber 238 would preferably communicate with the throat of the venturi 52, rather than with the passage 50 at a point upstream of the venturi 52, in which case the following approximate air or gas flow equation, which, over the pressure ratios involved in the invention, is accurate to 99½%, would apply:

$$W_g = KA_v \sqrt{\frac{P_2(P_1 - P_2)}{T_2}}$$

wherein $W_g$ is the flow of the natural gas, $A_v$ is the area of the venturi, $P_1$ is the pressure of the gas upstream of the venturi, $P_2$ is the pressure of the gas at the throat of the venturi and $T_2$ is the temperature of the gas. As previously mentioned, if temperature were to remain constant, the temperature adjustment assembly 162 and the fixed restriction 156 would not be required.

Figure 2:
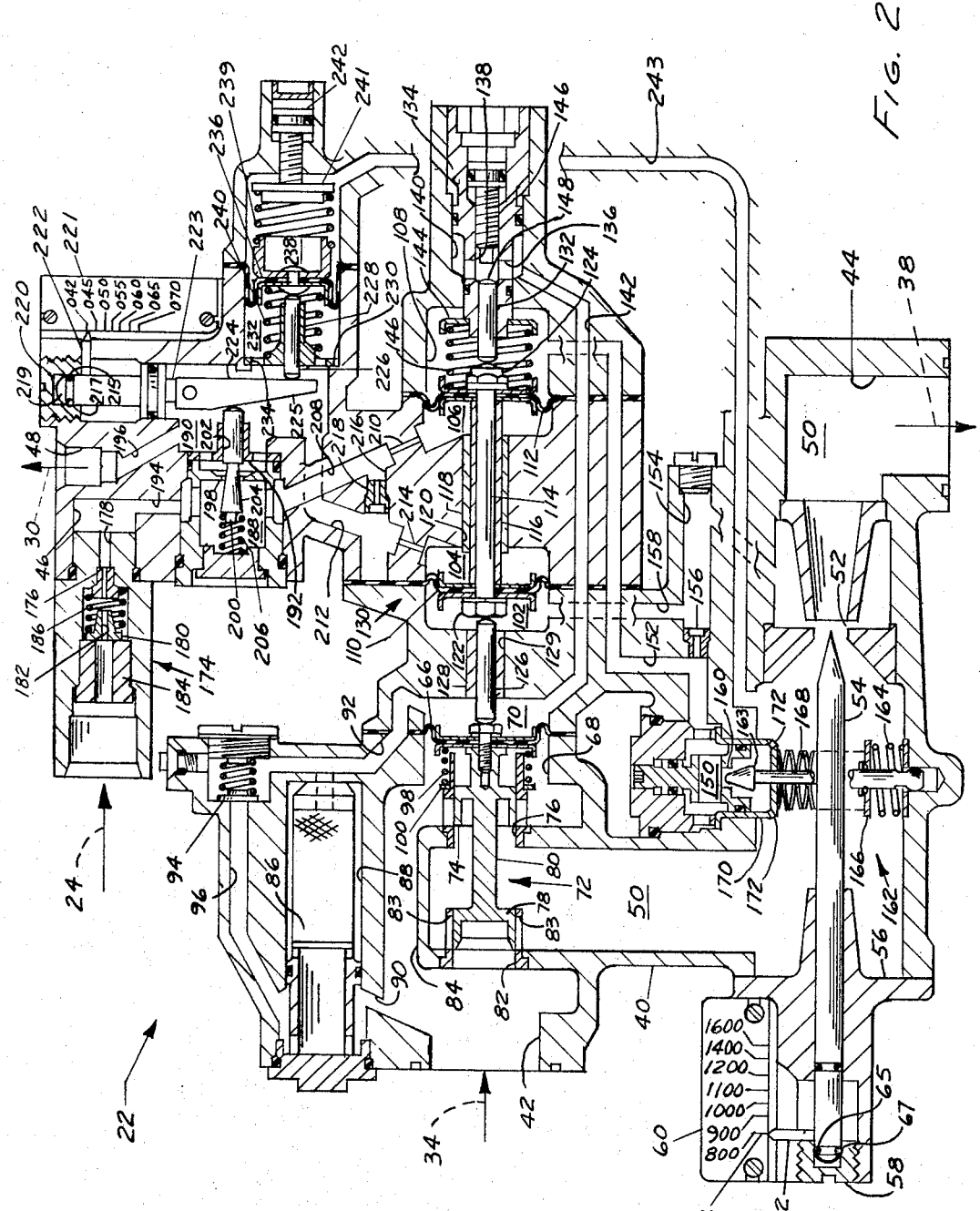
FIGURE 2 is a schematic illustration of a fuel control embodying the invention.

While the location of the inlet to the passage 243 at the venturi meets the requirements of the above equation, for some unexplainable reason tests have indicated that better operation is obtained when the inlet to the passage 243 is located upstream of the venturi; hence, the preferred embodimnt is as illustrated in FIGURE 2, which, in effect, changes the above equation to $$W_g = KA_v \sqrt{\frac{P_1(P_1 - P_2)}{T_2}}$$

Figure 4:
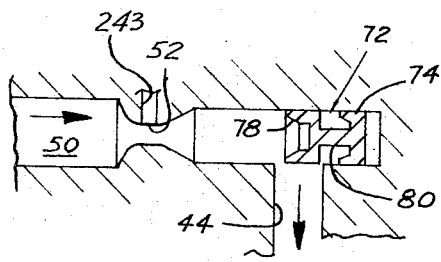
FIGURE 4 is a fragmentary view illustrating another modification of a portion of the structure shown by FIGURE 2.

As illustrated in FIGURE 4, the throttling valve 72 may be mounted downstream of the venturi 52, adjacent the gaseous fuel outlet 44, instead of in the cylindrical opning 82 upstream thereof, as illustrated in FIGURE 2. The downstream location is preferred for those applications wherein the pressure of the gas, as received from the source 32, is constant. That is, so long as the gas pressure is maintained at a constant value, there need be no compensation across the diaphragm assembly 236; thus, the assembly 236, the chamber 232 and 238, the springs 239 and 240, the adjustment screw 242 and the passage 243 could be eliminated. In that event, the sliding pin 226 would merely be replaced by a fixed abutment for the lever 224, or by an abutment which is externally manually adjustable to correct for tolerance variations.

Operation

Figure 5:
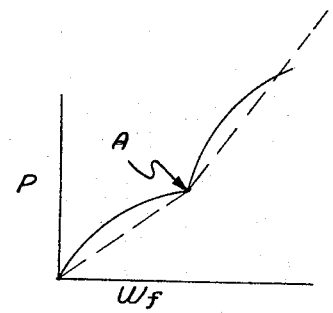
FIGURE 5 is a graphical representation of a characteristic of the invention.

As mentioned above, when it is desirable to operate a turbine engine 10 with gaseous fuel, rather than with liquid fuel, liquid fuel enters the inlet 46 (FIGURE 2) of the gaseous fuel control 22 from the conduit 24, having been diverted from the conduit 16 by the manipulation of the valves 26 and 28. The check valve assembly 174 may be an accessory item which is threadedly inserted in the inlet 46 only when a particular engine 10 normally receives liquid fuel from the conduit 16 through a so-called duplex nozzle (not shown). A duplex nozzle serves to back-pressure the liquid being received from the liquid fuel control 14 to produce two different pressure vs. fuel flow ratios, such as illustrated by the solid line curve, FIGURE 5. Since the liquid fuel is being diverted from the conduit 16 to the conduit 24, it is essential that it be back-pressured in a manner similar to the back-pressuring effect of the duplex nozzle. The valve assembly 174 fulfills this requirement in that, once the fuel flow is such that some predetermined pressure drop exists across the valve 180, comparable to point A, FIGURE 5, the valve will be lifted off the abutment seat 184 and yet held away from the fixed restriction 176 by the spring 186. Fuel flow will now be controlled by the larger diameter opening, say, .060″, through the fixed restriction 176, rather than by the considerably smaller opening 182, say, .020″, through the valve 180. The resulting pressure vs. fuel flow relationship, while not exactly the same as that of a duplex nozzle, will be, for all practical purposes, substantially the same, as indicated by the dash line curve of FIGURE 5.

Liquid fuel which thus enters the inlet 46 flows through the passage 194, into the chamber 188, past the valve 200 into the chamber 190, and through the passage 196 to the outlet 48, from which it then returns to the liquid fuel source 18 (FIGURE 1) by way of the conduit 30. The pressure of the liquid in the chamber 188 is transmitted to the chamber 106 by way of the passage 208 and the dampening restriction 210, the latter being provided in order to restrict the effect of any pulsating flow on the diaphragm 112. The pressure of the liquid fuel in the chamber 190, being indicative of the pressure drop through the valve 204/198, is transmitted to the chamber 104 via the passage 212 and the dampening restriction 214, the latter serving the same purpose as that of the restriction 210.

Ignoring, for the moment, the effect of the gas density adjustment screw 220, the exact position of the contoured valve 200 is influenced in part by the gaseous fuel pressure in the chamber 238, which not only reflects either venturi 52 throat pressure $P_2$ or upstream pressure $P_1$, as previously explained, but which is modulated by compressor discharge pressure due to back-pressure from the compressor through the conduit 38, the venturi 52 and the passage 243. The pressure in the chamber 238 thus moves the valve 200 through the diaphragm 236, the pin 226 and the lever 224, thereby modifying the fuel signal to the chambers 104 and 106 in response to changes in compressor discharge pressure. The adjustment screw 242 is provided in order to attain a desired acceleration curve shape by adjusting the position of the valve 200 after assembly, thereby eliminating any errors due to the stack-up of tolerances of elements 200, 224, 226 and 236.

The fixed restriction 218 is provided as a calibration aid, in order to move the acceleration curve up or down, without appreciably affecting its shape, for a proper fuel flow vs. speed relationship. It is the combined pressure drop across the valve 204/198 and the restriction 218 which results in a difference in pressures in the chambers 104 and 106. This pressure differential is proportional to the fuel flow output of the liquid fuel control device 14 and serves as the hydraulic signal which, in effect, indicates to the force balance system 130 just how much fuel should be going through the gas control. The resultant force on the diaphragms 112 and 110 is toward the right in FIGURE 2, since a greater pressure exists in the chamber 106 than in the chamber 104.

The natural gas which enters the inlet 42 from the conduit 34 flows past the valve 78, through the openings 83 and thence through the main fuel passage 50, the venturi 52 and the outlet 44, to the engine 10 via the conduit 38. As already explained, the resultant force of the system 130 including diaphragms 110 and 112 due to the pressure of the liquid fuel, which is indicative of the gaseous fuel flow desired, is eventually balanced by an opposing resultant force due to the above described gaseous flow. This opposing force is the result of gaseous fuel from the main passage 50 flowing through the openings 172, pass the valve 160/163, into the chamber 108 via the passage 152 and into the chamber 102 via the passage 158 and the fixed temperature modulating restriction 156. The force is affected by the pressure drop occurring at the venturi 52, the latter effect being transmitted to the passage 158 via the passage 154. Hence, the total drop across the venturi 52 and the restriction 156 is proportional to the actual gaseous fuel flow and results in a pressure differential in the chambers 102 and 108, tending to move the diaphragms 110 and 112 to the left in FIGURE 2, in opposition to the rightward movement due to the liquid fuel pressure force as previously mentioned.

It should now be apparent that any time that a change in liquid fuel flow is produced by the various parameters employed in the operation of the liquid fuel control 14 and that the change is reflected in the chambers 104 and 106, causing the valve 78 to be moved either toward or away from the cylindrical opening 82. This varies the openings 83 and results in either less or more gaseous fuel flowing therethrough. As the gaseous fuel flow in the main passage 50 is thus decreased or increased, the pressure change will be reflected in or fed back to the chambers 102 and 108, and the valve 78 will once again move until the resultant liquid fuel force to the right exactly balances the resultant gaseous fuel force to the left.

In order that the feed back force balance system 130 reflect only pressure differences proportional to the liquid and gaseous fuel flows, the pressure on the front face of the valve 78 and in the chamber 68 against the diaphragm 66 is washed-out by the pressure within the chamber 70 against the other side of the diaphragm 66, plus the pressure against the end 148 of the balancing pin 132. In other words, the total effective pressure acting upon the left side of the diaphragm 66 is exactly equal to the total effective pressure acting on the right side of the diaphragm 66. The adjustable stop member 146 is provided in order to protect the engine 10 from pressure surges. Also, the position of the spring retainer 144 may be adjusted by turning the member 134.

The filter 86 in the chamber 88 is included to insure that only clean gaseous fluid be supplied to the chambers 70 and 138. Thus, any gas which escapes past the pins 126 and 132 as a result of their being slidably fitted within the bushings 128 and 134, respectively, will not contaminate the sliding surfaces.

In those applications wherein the temperature of the gas is subject to fluctuations, the temperature compensating valve assembly 162 may be employed. As temperature increases, there will be a corresponding decrease in density of the gaseous fuel. This decrease in density will be compensated for by virtue of the increased temperature causing the bimetallic disks 168 to expand and thereby decreasing the pressure drop across the opening 163/160. The leftward resultant force (FIGURE 2) of the system 30 will be decreased, producing a larger opening 78/83 and a corresponding increased flow of the less dense gaseous fuel. Of course, a decrease in temperature will have the opposite effect.

When a different supply of natural gas is used, it may very well be that its heat content will be different. If a B.t.u. adjustment mechanism 58/54 is employed, the change in heat content may be compensated for by resetting the position of the tapered rod 54. This is accomplished simply by turning the screw 58 until the new B.t.u. value, corresponding to the reading of a calorimeter, for example, is indicated by the marker 62 on the scale 60. If it becomes necessary to adjust from a setting of 800 B.t.u. (lean) to 1600 B.t.u. (rich), for example, it is apparent that the pointed end of the rod 54 would extend further into the venturi 53, thereby decreasing the size of the opening therethrough. This would result in a greater fuel velocity through the venturi, and the consequent reduced pressure at the venturi 52 would cause a corresponding decrease in pressure in the chamber 102. This, of course, will move the throttling valve 78 to the left and reduce the fuel flow through the opening 83. Thus, fuel flow to the engine 10 will be sufficient to meet the total energy requirements thereof.

Should it be determined that the density of the gaseous fuel has changed, as due to a different fuel supply, for example, the screw 220 may be turned to a new density reading on the scale 221. This will move the valve 200, due to its engagement with the sloped portion of the lever 224, resulting in a change in the pressure differential in the chambers 104 and 106 and causing a repositioning of the valve 78 accordingly. Thus, the gaseous fuel flow to the engine 10 will once again be changed to supply the engine with its total energy requirements, lower densities requiring greater fuel flow and higher densities requiring less fuel flow for a particular energy requirement. Where no provision for density adjustments is desired, the lever 224 need not include the shaped portion 225 and, in fact, could be eliminated if the chambers 232 and 238 were arranged so that the sliding pin 226 were aligned with and in direct contact with the end of the valve 200.

It would be possible to produce a B.t.u. adjustment with the adjusting screw 220 and to compensate for density changes by adjusting the screw 58; in other words, with a recalibration, the density and B.t.u. adjustment functions could be reversed.

It should be noted that the gaseous portion of the fuel control 22 is a low pressure system and need only be supplied with natural gas at a pressure greater than the compressor discharge line pressure in conduit 38. In a typical application, the compressor discharge pressure will be approximately five times atmospheric pressure; under such circumstances, the minimum pressure at which the gaseous control will function is on the order of 75 p.s.i.

It should be apparent from the above discussion that the invention has provided a means whereby stationary and turbine engines may be operated with either liquid fuel or gaseous fuel by simply switching from one to the other through a suitable valving arrangement. As described, when it is desirable to use gaseous fuel, the liquid fuel control will continue to operate in order to provide a hydraulic signal to the gaseous control, but will merely recirculate liquid fuel back to the reservoir.

It should be further apparent that the basic gaseous control unit may be made more versatile by the inclusion of accessory features which may either be subsequently added to the basic control, or which may be provided as original equipment, in order to correct gaseous fuel flow for changes in temperature, density and/or heat content (B.t.u.) variations.

While but three embodiments, along with various possible adjustment features, of the basic gaseous control have been shown and described for pusposes of illustration, it is apparent that other modifications of the invention may be possible within the scope of the appended claims.

What we claim as our invention is:

1. The combination of a gas turbine engine capable of operation solely on either liquid or gaseous fuel, said engine having a liquid fuel system including a fuel source and a fuel control having means operative at all times that the engine is operative for scheduling liquid fuel in accordance with engine requirements throughout the entire range of operation thereof, a gaseous fuel control device connected between a gaseous fuel source and said engine, means for at times preventing any of the liquid fuel scheduled by said liquid fuel control from reaching said engine and for causing some portion thereof to pass through said gaseous fuel control and back to said liquid fuel source, said gaseous fuel control comprising a feed back force balance system acted upon by the liquid fuel and the gaseous fuel passing therethrough, a gaseous fuel throttling valve operated by said force balance system, said force balance system and throttling valve being constructed and arranged so that the liquid fuel passing through said gaseous fuel control at any given time causes an equivalent quantity of gaseous fuel to be supplied to said engine.

2. A gaseous fuel control device adapted for use in combination with a gas turbine engine capable of operation solely on either liquid or gaseous fuel, the engine having a liquid fuel system including a fuel source, a fuel control having means operative at all times that the engine is operative for scheduling liquid fuel in accordance with engine requirements throughout the entire range of operation thereof, and means for at times preventing any of the liquid fuel scheduled by said liquid fuel control from reaching said engine and for causing some portion thereof to pass through said gaseous fuel control and back to said liquid fuel source, said gaseous fuel control device being connected between a gaseous fuel source and said engine and comprising a feed back force balance system acted upon by the liquid fuel and the gaseous fuel passing therethrough and a gaseous fuel throttling valve operated by said force balance system, said force balance system and throttling valve being constructed and arranged so that the liquid fuel passing through said gaseous fuel control at any given time causes an equivalent quantity of gaseous fuel to be supplied to said engine.

3. The device described in claim 2, and including, additionally, means for adjusting the gaseous fuel flow through said gaseous fuel control device according to the density thereof.

4. The device described in claim 2, and including, additionally, means for adjusting the fuel flow through said gaseous fuel control device to compensate for changes in gas density due to changes in temperature thereof.

5. For use with a liquid fuel control device for supplying the total energy requirements to a gas turbine engine also having a source of gaseous fuel, a gaseous fuel control device, comprising a feed back force balance system, a throttling valve operable in response to movement of said force balance system, means for moving said system in response to a force due to a pressure drop which is proportional to the fuel flow output of said liquid fuel control device, and means for opposing said last mentioned movement with a force due to a pressure drop which is proportional to the fuel flow through said gaseous fuel control device and thereby repositioning said throttling valve until the pressures across said force balance system are balanced.

6. The device described in claim 5, wherein said first mentioned means includes a liquid fuel inlet to said gaseous fuel control device, a liquid fuel outlet from said gaseous fuel control device, a passage communicating therebetween, a spring loaded compensating valve mounted in said passage, a pair of passages communicating a pressure differential to said force balance system indicative of the pressure drop across said compensating valve, a passage communicating between said pair of passages and a fixed restriction in said last mentioned passage.

7. The device described in claim 5, wherein said last mentioned means includes a venturi located in the gaseous fuel flow passage and a pair of passages communicating to said force balance system the differential between the pressure at the throat of said venturi and a point upstream thereof.

8. The device described in claim 5, and including, additionally, means for modulating said liquid fuel signal in accordance with changes in the gaseous fuel inlet pressure.

9. The device described in claim 8, wherein said means includes a venturi located in the main gaseous fuel flow passage, a pair of chambers, a pressure responsive device forming a movable wall between said chambers, a fixed member mounted between said pressure responsive device and said spring loaded valve for moving said valve in response to movements of said pressure responsive device and a passage communicating between one of said chambers and the throat of said venturi.

10. The device described in claim 5, and including, additionally, means for adjusting the gaseous fuel flow through said gaseous fuel control device to compensate for changes in gas density due to changes in temperature thereof.

11. The device described in claim 10, wherein said means includes a venturi located in the main gaseous flow passage, a pair of passages communicating a pressure differential across said force balance system indicative of the pressure drop between the throat of said venturi and a point upstream of said venturi, a temperature responsive valve for controlling the opening into said passage upstream of said venturi and a fixed restriction communicating between said pair of passages.

12. For use with a gas turbine engine, a gaseous fuel control device comprising a source of gaseous fuel, a feed back force balance system, a throttling valve operable in response to movement of said force balance system, means for causing movement of said force balance system in response to changes in operating parameters of said turbine engine, and means for opposing said last mentioned movement with a force which is proportional to the fuel flow through said gaseous fuel control and thereby repositioning said throttling valve until the pressures across said force balance system are balanced.

13. The device described in claim 12, wherein said first mentioned means is a liquid fuel control for providing hydraulic fuel flow to said gaseous fuel control device, means for converting said hydraulic fuel flow to a hydraulic signal, means for transmitting said hydraulic signal to said force balance system, and means for modulating said signal in response to changes in the inlet pressure of the gaseous fuel.

14. For use with a gas turbine engine having a liquid fuel control device, a gaseous fuel control device comprising a force balance system including two pairs of chambers, each pair of chambers having a pressure responsive device forming a movable wall therebetween, a stem connecting the two pressure responsive devices, and a throttling valve operatively connected to said stem for movement therewith; a liquid fuel inlet, a liquid fuel outlet, a passage communicating therebetween, a compensating valve in said passage and a pair of passages communicated between one of each of said pairs of chambers and said liquid fuel passage at points upstream and downstream of said compensating valve; a gaseous fuel inlet, a gaseous fuel outlet, a main fuel flow passage therebetween, a venturi formed in said main fuel passage and a pair of conduits communicating between the other of each of said pairs of chambers and said main gaseous fuel passage at the throat of said venturi and at a point upstream thereof.

15. The device described in claim 14, wherein said throttling valve is located downstream of said venturi.

16. The device described in claim 14, and including, additionally, an automatic temperature compensating means associated with said last mentioned pair of passages.

17. The device described in claim 16, wherein said temperature compensating means includes a valve seat located in one of said pair of passages, a valve, a spring urging said valve toward said valve seat, a plurality of temperature responsive disks operatively connected to said valve, and a passage including a fixed restriction communicating between said last mentioned pair of passages.

18. The device described in claim 14, and including, additionally, a means for modulating the liquid fuel signal past said compensating valve in accordance with changes in the inlet pressure of the gaseous fuel.

19. The device described in claim 18, wherein said modulating means includes a pair of chambers, a pressure responsive device forming a movable wall between said chambers, connecting means between said pressure responsive device and said compensating valve, and a passage communicating between one of said pair of chambers and the throat of said venturi.

20. The device described in claim 18, wherein said modulating means includes additional means for manually adjusting the starting position of said compensating valve in order to control the shape of the acceleration curve.

21. The device described in claim 14, including, additionally, means operatively connected to said compensating valve for adjusting the liquid fuel signal to compensate for a charge in heat content of the gaseous fuel.

22. The device described in claim 14, and including, additionally, means for automatically adjusting the position of said throttling valve to compensate for changes in gas density due to changes in the temperature of the gaseous fuel.

23. The device described in claim 14, and including, additionally, means for limiting the movement of said force balance system in order to prevent fuel flow surges.

References Cited

UNITED STATES PATENTS

| | | | |
|---|---|---|---|
| 2,388,669 | 11/1945 | Baker | 137—91 X |
| 2,648,499 | 8/1953 | Dana | 158—11 X |
| 2,931,429 | 4/1960 | Brown. | |
| 3,135,314 | 6/1964 | Brunner. | |
| 3,241,597 | 3/1966 | Juzi | 158—11 X |

FREDERICK L. MATTESON, JR., *Primary Examiner.*

E. G. FAVORS, *Assistant Examiner.*